INVENTOR.
JOHN R. PERRY.

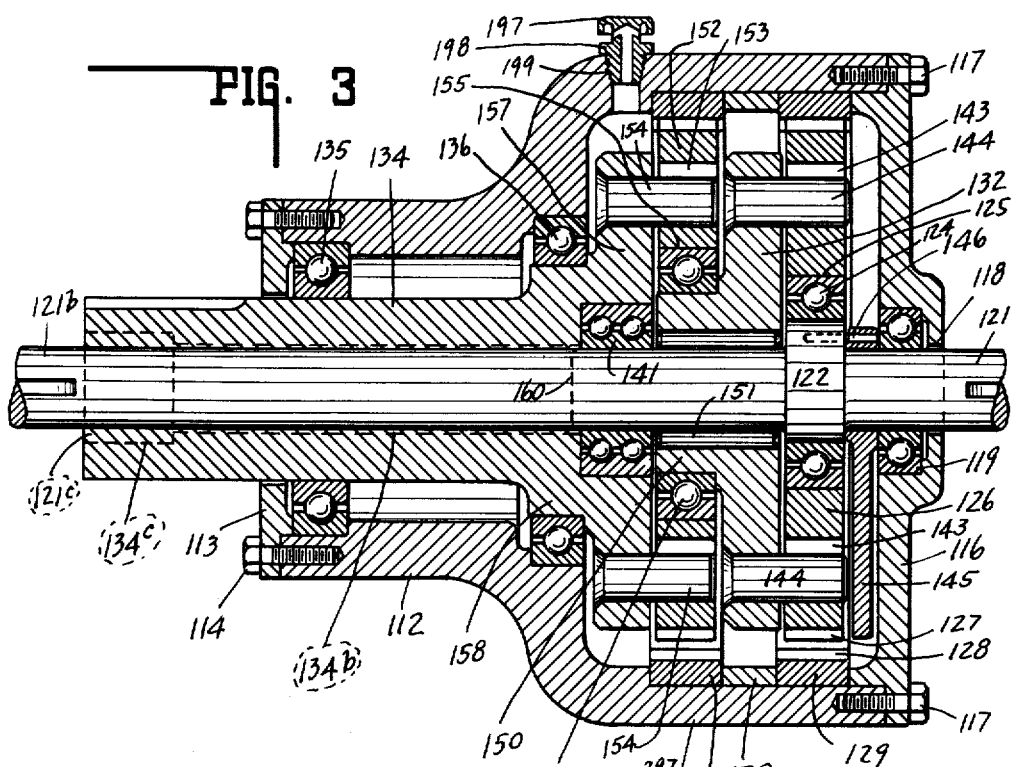
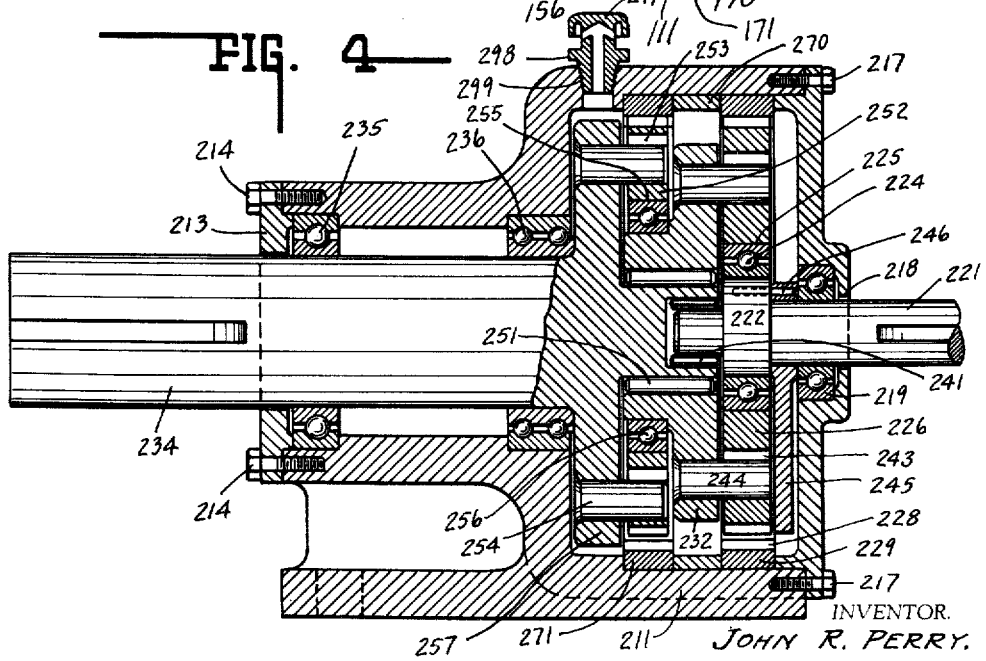

Patented Aug. 29, 1939

2,170,951

UNITED STATES PATENT OFFICE 2,170,951

CONTINUOUS POWER ECCENTRIC DUAL GEAR SPEED REDUCER

John R. Perry, Danville, Ill., assignor to Fred W. Coffing and R. R. Bookwalter, doing business as the Coffing Hoist Co., Danville, Ill.

Application December 6, 1937, Serial No. 178,319

6 Claims. (Cl. 74—308)

This invention relates to a speed changing device and is herein illustrated and described as of the reducing character, although it is to be understood it is not restricted solely to this function.

The chief object of this invention is to provide a speed changing device which contains but relatively few parts and these of standard character and so arranged that friction loss in the speed transformation is of a minimum character.

The chief feature of the invention consists in the accomplishment of the foregoing object by eccentrically driving a gear which meshes with an internal gear, the former gear being of lesser size than the latter gear and the eccentrically driven gear having a multiple pin and socket power transmitting connection to a driven shaft.

One characteristic of the invention is that any desired speed ratio may be obtained between the driving and driven shafts within the predetermined range of operation, as will be more fully set forth hereinafter, and the power transformation being so effected that pulsations are substantially eliminated by the employment of a suitable number of arcuately spaced pin and socket arrangements, the spacing of which is no greater than 90° and preferably is lesser than that amount.

Another object of the invention is to provide a device of the aforesaid general character, which is of multiple form, whereby each unit has a predetermined ratio and the summation is a relatively large ratio, so that one shaft may be driven at relatively high speed and the other shaft driven at an extremely low speed. This permits high speed, low unit power application to be transformed into low speed, high power application, thereby permitting the use of relatively small power high speed motor devices for driving relatively low speed, heavy duty appliances.

Other objects and features will be pointed out more fully hereinafter in the following description.

The full nature of the invention will be understood from the accompanying drawings and the following description and claims:

In the drawings,

Fig. 3 is a view similar to Fig. 1 and of a multiple form of the invention.

Fig. 4 is a view similar to Figs. 1 and 3 and of a modified multiple form of the invention.

Figure 1:
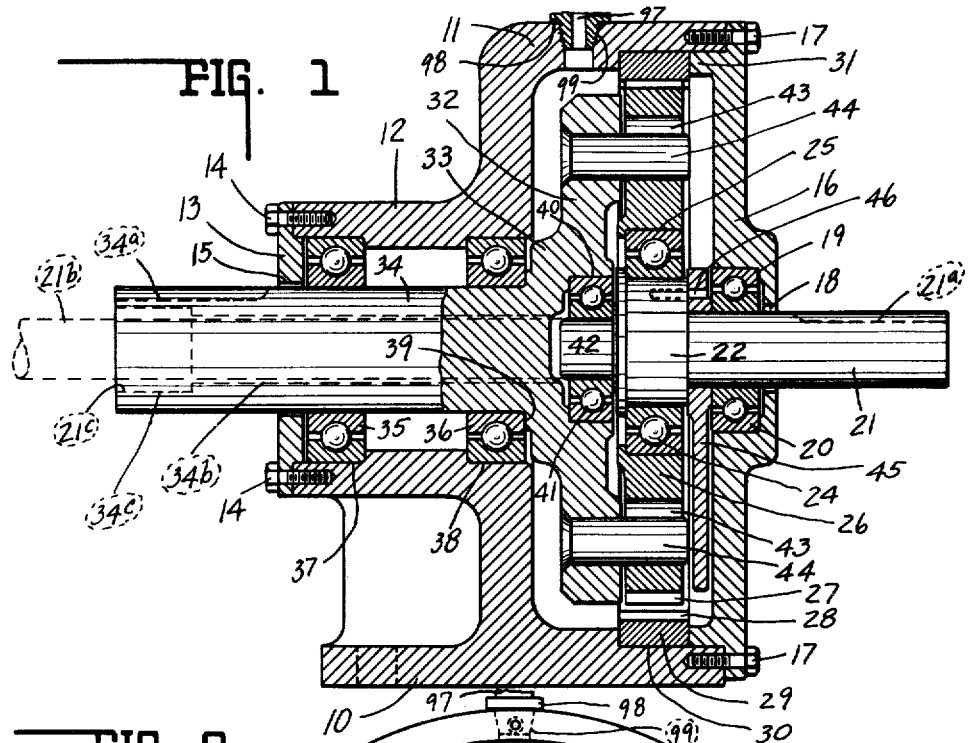
Fig. 1 is a central sectional view through a single unit embodiment of the invention, certain dotted lines therein representing a modified form thereof.
Figure 2:
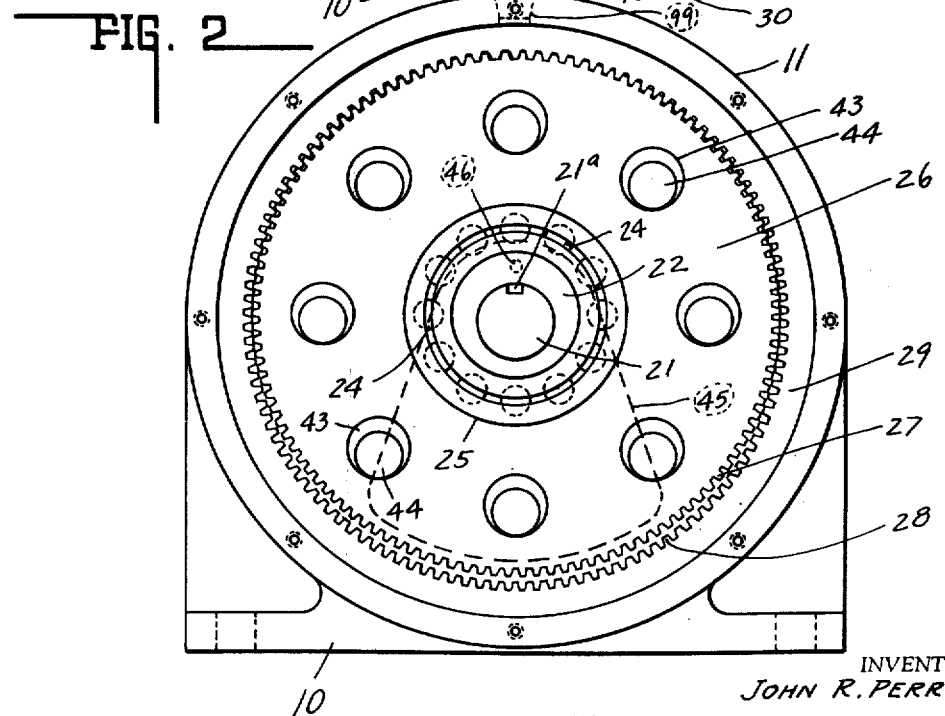
Fig. 2 is an end view thereof with the cover plate removed.

In Figs. 1 and 2 of the drawings, 10 indicates a base structure which has integral therewith a housing portion 11 with a reduced portion 12. The reduced portion 12 is closed by an apertured cap 13 secured by cap screws 14, the aperture being indicated by the numeral 15. The larger portion 11 of the housing is closed by an apertured cover plate 16 secured thereto by the cap screws 17 and apertured as at 18. The cover cap 16 includes a socket 19 which mounts an anti-friction structure in the form of a ball race 20 which rotatably supports what herein is termed the driving shaft 21. Rigid with the driving shaft 21 is a cylindrical eccentric 22 which rotates in an anti-friction structure, herein shown in the form of a ball race structure 24, the latter being seated in the bore 25 in the gear 26 having peripherally thereon, in the present instance, the teeth 27. The teeth and bore are concentric.

The gear 26 meshes with the teeth 28 of the internal ring gear 29 rigidly secured in the socket or seat portion 30 formed in the housing 11 and retained therein in rigid relation by the flange portion 31 of the cover cap 16. The diameter of the eccentrically driven gear 26 is less than the diameter of the internal gear 29—see Fig. 2.

Positioned within the housing 11 is a driven plate 32. A plate formation is utilized because it provides the greatest strength. This plate has a hub portion 33 which is elongated as at 34 and forms a shaft arrangement which may be termed the driven shaft. The driving shaft 21 may be provided with a keyway 21a and the driven shaft 34 may be provided with a keyway 34a, one for connection to a source of power and the other for connection to a power operable device. Any other forms of connections well known in the industry or this art may be provided, however.

The shaft portion 34 is rotatably supported by the anti-friction structures 35 and 36, the former being supported in the remote end of the reduced housing portion 12 in the seat 37 and retained therein by the cap 13. The latter is supported in the seat 38 also formed in the reduced housing portion 12 and is retained therein by the shoulder 39 formed on the hub 33 of the plate. The hub 33 of the plate 32 is provided with a socket 40 which supports an anti-friction structure in the form of a ball race 41 that rotatably supports the reduced end 42 of the shaft 21. Thus, the shaft 21 at opposite sides of the cylindrical eccentric 22 is anti-frictionally supported and the shaft 34, as before mentioned, is anti-frictionally supported in two spaced parallel planes.

Herein the gear 26 is so provided with a plurality of substantially identical cylindrical apertures 43 which are larger in diameter than the cooperating pins or trunnions 44 seated therein, see Fig. 2. Herein eight of these cooperating pin and opening connections are illustrated and these are positioned at 45° arcuate spacing and are equidistant from the axis of the gear 26. The trunnions or pins 44 are suitably supported by the plate 32 in the same spaced relation and are equidistant from the axis of rotation of the plate.

Herein the shaft 34 is illustrated as having its axis coaxial with the axis of shaft 21 and the axis of the ring gear 29 is similarly coaxial. The teeth 27 of the eccentrically driven gear, the bore thereof and the axis of the cylindrical eccentric are all coaxial.

When the shaft 21 is rotated, the eccentric 22 also rotates which carries with it the eccentrically driven gear 26. This eccentrically driven gear in its rotation rolls around within the ring gear, although if any single tooth of the driven gear be observed in its rotation, it will be noted that it has in effect a certain skipping or hopping action, the amount thereof being determinable by the difference in the number of teeth between the two gears.

In this rotational movement of the eccentrically driven gear, certain portions of the walls of the opening 43 engage certain portions of the trunnions or pins 44 and thus the trunnions supporting plate together with the shaft 34 is caused to rotate but the ratio of rotation between such shaft 34 and the shaft 21 is that hereinafter set forth. It is to be noted, however, that the pitch of the teeth of the two gears is the same.

It will also be noted the direction of rotation of shaft 34 is the reverse of that of shaft 21. The number of teeth in the two gears must be sufficiently large to secure the desired function. The eccentrically driven gear must be sufficiently large to accommodate the required number of openings.

It will be readily apparent, if desired, the trunnions may be carried by the gear and the openings formed in the plate 32 without departing from the invention since this constitutes a mere reversal of the driving connection between these two parts.

In Figs. 1 and 2 of the drawings, if it be assumed that the ring gear has 108 teeth and the eccentrically driven gear has 105 teeth, then the difference between the two is three teeth. 108, the number of teeth, divided by this difference 3, leaves quotient 36 and this less unity leaves 35 as the answer, which is the speed ratio between shaft 21 and the shaft 34,—that is, shaft 21 will rotate thirty-five times for each rotation of shaft 34. The example illustrated may be otherwise expressed. The difference between the number of teeth in the two gears is 3, the quotient of 105 divided by 3 is 35, or the ratio between the two shafts.

To further illustrate the invention, if it be assumed the ring gear has 110 teeth and the ring gear 105 and the teeth are of the same pitch, the difference is 5, and the quotient of 110 divided by 5 is 22 less unity, gives the ratio 21, or in this same example, 105, the number of teeth in the eccentrically driven gear, divided by 5 also gives the ratio 21. It is not necessary that this ratio always be a full number or an odd number. For example, if there be 109 teeth in the ring gear and 106 in the eccentrically driven gear, the difference is 3. The quotient 109 divided by 3 is 36⅓, which less unity gives 35⅓ as the ratio of rotation between the two shafts. Similarly in this example, 106 (the number of teeth in the eccentrically driven gear) divided by 3 gives the quotient 35⅓ or the same ratio.

As before mentioned, any specific tooth has a travel with respect to the adjacent teeth, which is arc like and for 16 pitch the length of said arc is equal to 3 teeth, that is, 108 minus 105, and the height of the arc is the full throw of the eccentric to which reference will now be had.

To determine the throw of the eccentric, the pitch diameter of the eccentrically driven gear is subtracted from the pitch diameter of the internal gear. In the present instance, the ring gear has 108 teeth of 16 pitch—20° pitch angle, stub type with a pitch diameter of 6¾". The eccentrically driven gear has 105 teeth of the same pitch, same type teeth, but the pitch diameter is $6\frac{11}{16}$". The different is $\frac{3}{16}$". This is the full throw of the eccentric. The eccentricity or offset center relationship of the same is $\frac{3}{32}$". The diameter of the hole 43 in the eccentrically driven gear must be at least equal to the full throw of the eccentric— in this particular instance $\frac{3}{16}$"—plus the diameter of the driving pins, and such clearance as may be desired. For example, the driving pins are ⅝" in diameter. The full throw of the eccentric is $\frac{3}{16}$" and if there be provided $\frac{1}{32}$" clearance, the total diameter of each hole would be $\frac{27}{32}$".

From the foregoing, it will be clearly understood how other similar speed change devices may be constructed. As previously pointed out, there are 8 pins and 8 holes illustrated in the present embodiment. There may be 6, 10, 5 or any odd number. As stated, the spacing is equidistant angularly and preferably there are more than 4 pins, that is, the central angle spacing is less than 90°. The reason for the aforesaid is that if but 4 pins be utilized, there is a slight pause and the operation is not continuous or uniform. With 5 or more pins, the operation is continuous because there is an overlapping of pin drive. In other words, at least one pin is always in driving connection—that is, transmitting power. Herein 8 pins and holes are illustrated and there is a substantial overlapping of pin drive, as it were, so that the operation is in effect continuous.

Whenever it is desired to produce a device which is capable of being driven from either side and the power being taken from one side, the shaft 34 is made tubular as indicated at 34b, and the shaft 21 is extended beyond the reduced portion 42 as indicated at 21b. In this event, the tubular shaft 34 has its bore 34b enlarged as at 34c and mounted therein is a bronze or like bushing 21c.

For balancing purposes, there is provided a counterweight 45 that is suitably secured as at 46 to the eccentric. Thus, the parts are in substantial dynamic balance.

Reference will now be had to Fig. 3. In this figure like or similar parts are indicated by similar numerals of the one hundred series. This form of the invention shows the device being capable of being driven from either end and the power take off only at one end. The housing 111 has the cover plate 116 secured to it as at 117 and has a reduced portion 112 closed by a cover cap 113 secured thereto as at 114. Briefly, the parts are as follows:—

121 is the driving shaft rotatably mounted in the anti-friction structure 119 and the same supports the eccentric 122 in the anti-friction structure 124 within the bore 125 of the gear 126, the teeth 127 of which mesh with the teeth 128 of the ring gear 129. The counterweight 145 is suitably secured to the eccentric as at 146.

The eccentrically driven gear 126 includes the openings 143 which receive the pins 144 carried by the trunnion supporting plate 132. The reduced portion 150 thereof is of eccentric form so far as its exterior is concerned, although it is of cylindrical character. Interposed between the shaft 121 and the portion 150 is an anti-friction structure 151. An eccentrically driven gear 152 is similarly provided with openings 153 in which are mounted trunnions 154. The bore 155 of said gear receives an anti-friction structure 156 that is interposed between said bore and the eccentric hub 150. The trunnions or pins 154 are carried by the plate portion 157 which is rotatably supported by anti-friction bearings 135 and 136. Plate portion 157 nests the dual anti-friction structure 141 which supports shaft 121.

Hub portion 158 of the trunnion supporting plate 157 is rotatably supported in the housing by anti-friction structure 136. The shaft portion 134 extending outwardly from the device, and constituting the driven shaft, is rotatably supported by the anti-friction structure 135. The shaft 134 is recessed as at 134c and positioned therein is the bronze bushing, or the like, 121c, which rotatably supports the oppositely projecting end 121b of the shaft 121. Shaft 134 for this purpose is of tubular character, as indicated at 134b.

Whenever it is desired to have the drive at one end only and the power taken from the opposite end, shaft 121 may terminate at the dotted line indicated by the numeral 160 and in that event, the shaft 134 need not be tubular.

It is assumed merely for simplicity that the corresponding gears of both transformations are substantially the same. Thus, the first stage of reduction results in a ratio of 35 to 1 and the second stage has a similar ratio. Therefore, the total reduction or ratio between the rates of rotation of shaft 121 and shaft 134 is as 1225 to 1. In other words, shaft 121 will rotate 1225 times for each rotation of the shaft 134.

It is not essential that the transformation in each stage of reduction or chain be the same. Neither is it essential that either the first or last or last or first transformation stage have the same gear ratio. It will be quite apparent that any number of additional stages of transformation within the range of efficiency or power transformation determinable by friction losses, may be incorporated in a device of the character broadly disclosed by Fig. 3, wherein but two stages only are illustrated. The two stages of transformation are spaced apart as shown in Fig. 3 by the dual race structure 141 and by spacing ring 170 which maintains the internal ring gear 171 in spaced relation to the internal ring gear 129.

It will be apparent from an examination of Fig. 3 that the diameters of the eccentric need not be the same, since it is the throw of the eccentric which is the critical factor in the transformation. Preferably for production purposes in a multiple stage power transformation, all the gears will have teeth of the same character thereon and have the same pitch.

In Fig. 4 of the drawings, numerals of the two hundred series indicate like or similar parts. In this form of the invention, multiple ratio change is obtained. However, in this form, the power is applied to one end and taken from the opposite end, and in this respect this form is similar to that shown in the full lines in Figs. 1 and 2. A multiple change, however, is effected so that this form is similar in this respect to that shown in Fig. 3.

If the smaller shaft 221 be considered the high speed shaft and the larger shaft 234 be considered the low speed shaft, it will be apparent that the high speed shaft in this form is supported by the low speed shaft rather than by an intermediate speed member such as shown at 132—150 in Fig. 3. The aforesaid imposes the heavy load on the slow speed arrangement resulting in less friction and, therefore, generation of less heat.

As shown in the several views, it is preferred to have the holes for pin reception in the members as illustrated and support the pins by the adjacent members rather than reverse this arrangement due to the better support of the pins, to-wit, the pin supporting members shown herein are better able to withstand the eccentric strains inherent in the basic invention disclosed.

Also, while heretofore in discussing the formulae clearance has been mentioned, usually this may be ignored because if none is provided for, the pins will always remain in contact with the walls of the circular openings receiving same. This prevents "chatter", "clicking" and other noises incident to making contact and the like therebetween. Although the pins are always in contact when no clearance is provided, the driving portion of such contact is substantially the same as the driving contact when clearance is provided.

Preferably the structure runs in lubricant which may be supplied through opening 99 in Fig. 1, 199 in Fig. 3 and 299 in Fig. 4, which are closed by breather plugs 98, 198 and 298, respectively, protected by caps 97, 197, and 297, respectively. This arrangement permits relief of excess pressure and prevents leakage along the shafts where the same project from the casing.

While the invention has been illustrated and described in great detail in the foregoing drawings and description, the same is to be considered illustrative only and not restrictive in character. Several modifications herein disclosed as well as suggested, together with those which will readily suggest themselves to persons skilled in this art, are all considered to be within the broad scope of the invention, reference being had to the appended claims.

The invention claimed is:

1. In a speed changing device, including a relatively stationary gear having a relatively large number of teeth, a second and smaller adjacent gear having a relatively large number of teeth thereon of the same shape as the first mentioned teeth, said gears having a plurality of pairs of confronting teeth in mesh, a shaft, an eccentric rigid therewith, said smaller gear having a central opening for eccentric reception, a second shaft axially aligned with the first shaft, and a plurality of parallel pins supported thereby equidistant from the axis of the second mentioned shaft and equally spaced annularly, said smaller gear having a corresponding number of circular apertures therein similar spaced, each last mentioned aperture seating a pin, all pins at all times occupying the same relative positions in the apertures as any one pin occupies in its aperture, all pin positions always being substantially 180° or opposite to that of the gear-to-gear contact, the pin 90° in advance of the gear contact being the then effective power transmitting pin and said last mentioned pin being 90° being the gear motion.

2. A device as defined by claim 1, characterized by the diameter of the similar openings being at least equal to that of the effective diameter of the pin and the throw of the eccentric and at least equal to the pin diameter aforesaid and the difference in the diameters of the gears.

3. A device as defined by claim 1, characterized by the number of pins and cooperating apertures exceeding four in number and the spacing therebetween being less than 90° whereby one pin adjacent the then 90° effective pin always is losing effectiveness of contact, and the other pin adjacent the then 90° effective pin always is entering effectiveness of contact.

4. A device as defined by claim 1, characterized by the addition of a counterbalanced to the first mentioned shaft, antifriction means between the eccentric and smaller gear and in the central aperture thereof, the first mentioned shaft extending into and being rotatably supported by the second mentioned shaft, and antifriction means interposed between the shafts in the last mentioned support arrangement.

5. A device as defined by claim 1, characterized by the addition of a second eccentric rigid with the second shaft, a third gear having a central aperture similarly associated with the second eccentric, a fourth and relatively stationary gear with which the third gear similarly meshes, the third gear being smaller than the fourth gear, and a third shaft axially aligned with the other shafts, and a plurality of spaced pins carried thereby similarly cooperating with a like number of circular apertures in the third gear and similarly positioned therein and relative to the third and fourth gear meshing contact.

6. A device as defined by claim 1, characterized by the addition of a housing enclosing all recited structure and through which at opposite sides projects said shafts, the stationary gear being rigid with said housing, and a breather structure for the housing substantially as and for the purpose described.

JOHN R. PERRY.

CERTIFICATE OF CORRECTION.

Patent No. 2,170,951. August 29, 1939.

JOHN R. PERRY.

It is hereby certified that error appears in the printed specification of the above numbered patent requiring correction as follows: Page 3, second column, line 68, claim 1, for "similar" read similarly; page 4, first column, line 1, same claim 1, for the word "being" second occurrence, read behind; line 18, claim 4, for "counterbalanced" read counterbalance; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.

and said last mentioned pin being 90° being the gear motion.

2. A device as defined by claim 1, characterized by the diameter of the similar openings being at least equal to that of the effective diameter of the pin and the throw of the eccentric and at least equal to the pin diameter aforesaid and the difference in the diameters of the gears.

3. A device as defined by claim 1, characterized by the number of pins and cooperating apertures exceeding four in number and the spacing therebetween being less than 90° whereby one pin adjacent the then 90° effective pin always is losing effectiveness of contact, and the other pin adjacent the then 90° effective pin always is entering effectiveness of contact.

4. A device as defined by claim 1, characterized by the addition of a counterbalanced to the first mentioned shaft, antifriction means between the eccentric and smaller gear and in the central aperture thereof, the first mentioned shaft extending into and being rotatably supported by the second mentioned shaft, and antifriction means interposed between the shafts in the last mentioned support arrangement.

5. A device as defined by claim 1, characterized by the addition of a second eccentric rigid with the second shaft, a third gear having a central aperture similarly associated with the second eccentric, a fourth and relatively stationary gear with which the third gear similarly meshes, the third gear being smaller than the fourth gear, and a third shaft axially aligned with the other shafts, and a plurality of spaced pins carried thereby similarly cooperating with a like number of circular apertures in the third gear and similarly positioned therein and relative to the third and fourth gear meshing contact.

6. A device as defined by claim 1, characterized by the addition of a housing enclosing all recited structure and through which at opposite sides projects said shafts, the stationary gear being rigid with said housing, and a breather structure for the housing substantially as and for the purpose described.

JOHN R. PERRY.

CERTIFICATE OF CORRECTION.

Patent No. 2,170,951.   August 29, 1939.

JOHN R. PERRY.

It is hereby certified that error appears in the printed specification of the above numbered patent requiring correction as follows: Page 3, second column, line 68, claim 1, for "similar" read similarly; page 4, first column, line 1, same claim 1, for the word "being" second occurrence, read behind; line 18, claim 4, for "counterbalanced" read counterbalance; and that the said Letters Patent should be read with this correction therein that the same may conform to the record of the case in the Patent Office.

Signed and sealed this 6th day of February, A. D. 1940.

(Seal)   Henry Van Arsdale, Acting Commissioner of Patents.